United States Patent
Cote et al.

(10) Patent No.: US 12,429,653 B2
(45) Date of Patent: Sep. 30, 2025

(54) ADAPTER TIP AND MICROSCOPE SYSTEM FOR INSPECTING DUPLEX FIBER-OPTIC CONNECTOR ENDFACES

(71) Applicant: EXFO Inc., Quebec (CA)

(72) Inventors: Olivier Cote, Quebec (CA); Mario L'Heureux, Quebec (CA); Raphael Laberge, Quebec (CA)

(73) Assignee: EXFO Inc., Quebec (CA)

( * ) Notice: Subject to any disclaimer, the term of this patent is extended or adjusted under 35 U.S.C. 154(b) by 358 days.

(21) Appl. No.: 18/310,861

(22) Filed: May 2, 2023

(65) Prior Publication Data

US 2023/0367082 A1 Nov. 16, 2023

Related U.S. Application Data

(60) Provisional application No. 63/391,087, filed on Jul. 21, 2022, provisional application No. 63/340,536, filed on May 11, 2022.

(51) Int. Cl.
*G02B 6/38* (2006.01)
*G02B 21/00* (2006.01)

(52) U.S. Cl.
CPC .......... *G02B 6/385* (2013.01); *G02B 6/3825* (2013.01); *G02B 6/3853* (2013.01); *G02B 21/0016* (2013.01); *G02B 21/0008* (2013.01)

(58) Field of Classification Search
CPC .... G02B 6/385; G02B 6/3825; G02B 6/3853; G02B 21/0016; G02B 21/0008; G01M 11/081; G01M 11/088
See application file for complete search history.

(56) References Cited

U.S. PATENT DOCUMENTS

| | | |
|---|---|---|
| 5,724,127 A | 3/1998 | Csipkes et al. |
| 6,751,017 B2 | 6/2004 | Cassady |
| 6,751,379 B2 | 6/2004 | Capewell et al. |
| 6,860,644 B2 | 3/2005 | Gage et al. |

(Continued)

OTHER PUBLICATIONS

Unknown Author, Guide on tips and adapters for fiber connector inspection, Reference guide ang v7 [online]. EXFO Inc., Printed in Canada 20/09 [retrieved on Jun. 30, 2022]. Retrieved from the Internet: <URL: https://www.exfo.com/umbraco/surface/file/download/?ni=22382&cn=en-US>.

(Continued)

*Primary Examiner* — John Bedtelyon
(74) *Attorney, Agent, or Firm* — Helene Chotard

(57) ABSTRACT

There is provided an adapter tip to be employed with an optical-fiber connector-endface inspection microscope device and an optical-fiber connector endface inspection microscope system suitable for imaging the endface of a duplex optical-fiber connector. Because of the distance between the ferrules of a duplex connector, the field of view of a typical single-fiber or multi-fiber inspection microscope may not be wide enough to allow inspection of both ferrules at once. The proposed adapter tip or microscope system may comprise relay optics configured to laterally shift the optical path of the light beam reflected from one optical fiber endface (corresponding the first ferrule) toward that from the other optical fiber endface (corresponding the second ferrule), so that both endfaces may be imaged within the field of view of the inspection microscope.

20 Claims, 16 Drawing Sheets

(56) References Cited

U.S. PATENT DOCUMENTS

| | | |
|---|---|---|
| 7,423,806 B2 | 9/2008 | Uhl et al. |
| 8,164,744 B2 | 4/2012 | Narum et al. |
| 8,294,080 B2 | 10/2012 | Rana |
| 8,976,345 B2 | 3/2015 | Zhou et al. |
| 9,551,831 B1 | 1/2017 | Peng et al. |
| 9,733,616 B2 | 8/2017 | Ruchet et al. |
| 9,797,806 B1 | 10/2017 | Zhou et al. |
| 9,841,579 B2 | 12/2017 | Baribault |
| 9,851,521 B2 | 12/2017 | Pelletier et al. |
| 9,880,359 B2 | 1/2018 | Morin-Drouin et al. |
| 9,915,790 B2 | 3/2018 | Baribault |
| 10,007,067 B2 | 6/2018 | Saito et al. |
| 10,101,570 B1 * | 10/2018 | Zhou .................. G02B 21/002 |
| 10,175,142 B2 | 1/2019 | Lafrance et al. |
| 10,627,310 B2 * | 4/2020 | Levin .................. G02B 6/385 |
| 11,099,331 B2 | 8/2021 | Lee et al. |
| 11,274,991 B2 | 3/2022 | Diepstraten et al. |
| 2018/0217338 A1 | 8/2018 | Takano et al. |
| 2022/0035104 A1 | 2/2022 | Filion et al. |
| 2022/0066111 A1 | 3/2022 | Wilhelm et al. |

OTHER PUBLICATIONS

Unknown Author, What is the difference between roof prism and Porro prism binoculars? [online]. Celestron,. Feb. 20, 2005 [retrieved on Oct. 5, 2022]. Retrieved from the Internet: <URL: https://www.celestron.com/blogs/knowledgebase/what-is-the-difference-between-roof-prism-and-porro-prism-binoculars>.

* cited by examiner

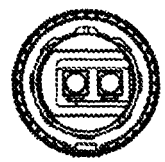
Fig. 6E
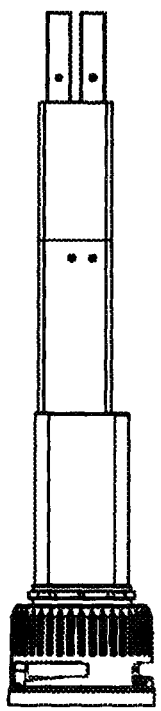 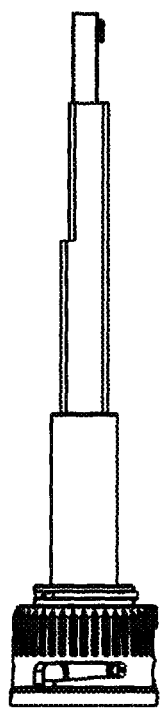 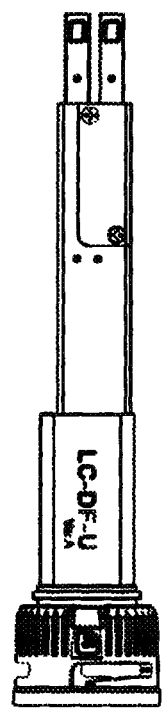 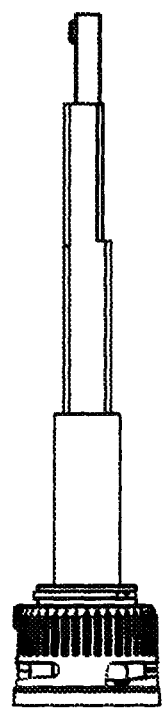
Fig. 6A  Fig. 6B  Fig. 6C  Fig. 6D
Fig. 6F

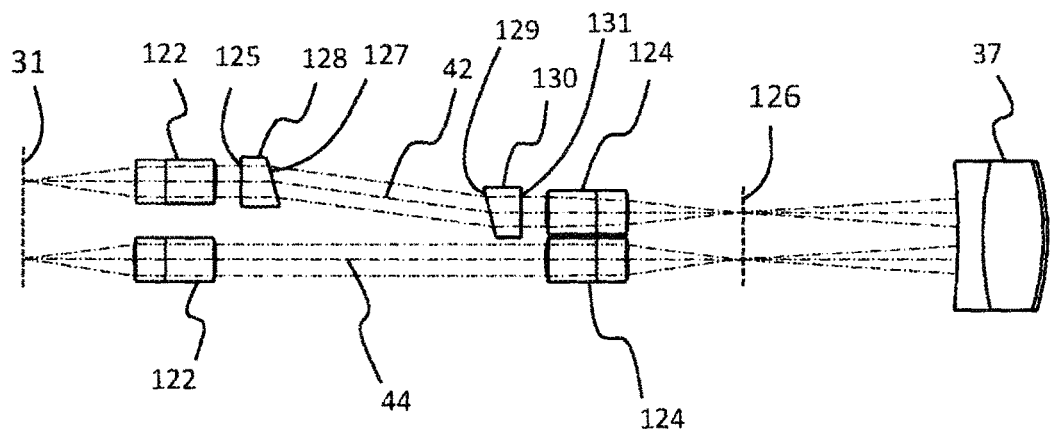
Fig. 8A
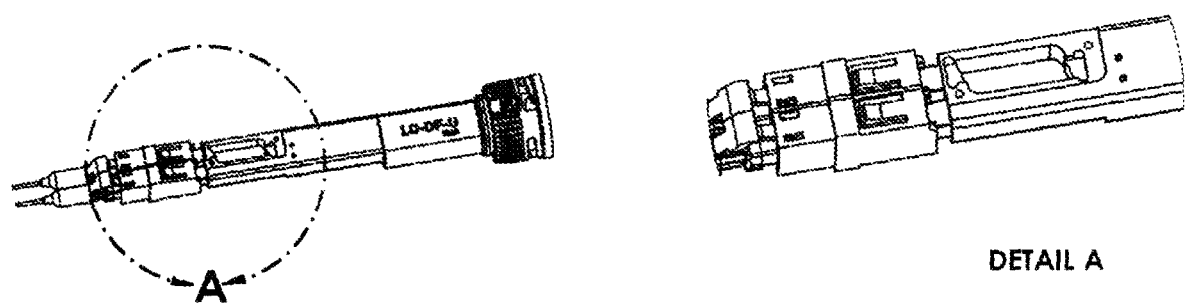
Fig. 8B
Fig. 8C
DETAIL A

SECTION
B-B

SECTION C-C

SECTION G-G

DETAIL H

44

United States Patent US 12,429,653 B2

ADAPTER TIP AND MICROSCOPE SYSTEM FOR INSPECTING DUPLEX FIBER-OPTIC CONNECTOR ENDFACES

TECHNICAL FIELD

The present description generally relates to inspection of optical-fiber connector endfaces and more specifically to adapter tips, to be used in conjunction with an optical-fiber connector endface inspection microscope device and suitable for imaging duplex optical-fiber connectors.

BACKGROUND

The quality and cleanliness of endfaces of optical-fiber connectors represent important factors for achieving adequate system performance of optical communication networks. Indeed, any contamination of or damage on the mating surface of an optical-fiber connector may severely degrade signal integrity. Optical-fiber inspection microscopes are commonly employed to visually inspect and/or to analyze the optical-fiber endface of an optical-fiber connector at installation or during maintenance of optical communication networks, in order to verify the quality of the optical-fiber connection.

Because of the wide variety of optical-fiber connector types deployed in the telecommunication industry, optical-fiber connector endface inspection microscopes are typically employed with interchangeable adapter tips so as to allow inspection of various types of optical-fiber connectors directly or as inserted in an optical-fiber connector adapter. Optical-fiber connector endface inspection microscopes are therefore typically designed for use with an adapter tip selected among a plurality of adapter tip types.

Optical-fiber connectors to be inspected can be single-fiber, multi-fiber (8 fibers or more) or duplex. Some inspection microscopes are designed with a large field of view allowing inspection of the whole endface of a multi-fiber connector. The field of view of a multi-fiber inspection microscope may cover about 5.4 mm by 2.0 mm, allowing to inspect up to 4 rows of 16 fibers at once (see FIG. 1A).

However, the required field of view width for inspecting an LC Duplex connector is about 6.75 mm (and even more for a SC Duplex connector) (see FIG. 1B).

There therefore remains a need a solution allowing to inspect duplex fiber-optic connectors such that the two distant ferrules are inspected at once.

SUMMARY

There is provided an adapter tip to be employed with an optical-fiber connector-endface inspection microscope device and an optical-fiber connector endface inspection microscope system suitable for imaging the endface of a duplex optical-fiber connector (recessed or not in a duplex connector adapter, sometimes also referred to as a bulkhead). Because of the distance between the ferrules of a duplex connector, the field of view of a typical single-fiber or multi-fiber inspection microscope may not be wide enough to allow inspection of both ferrules at once. The proposed adapter tip or microscope system may comprise relay optics configured to laterally shift the optical path of the light beam reflected from one optical fiber endface (corresponding the first ferrule) toward that from the other optical fiber endface (corresponding the second ferrule), so that both endfaces may be imaged within the field of view of the inspection microscope.

The lateral shift introduced by the relay optics allows to somehow bring the two objects closer to one another so as to image the two optical fiber endfaces at once, although they would otherwise be too far away from one another to fit in the field of view of the inspection microscope. In the inspection microscope, the two endfaces can be imaged on the same image sensor (e.g., using a single-fiber or multi-fiber inspection microscope) or using two image sensors (e.g., as sometimes used in the art in multi-fiber inspection microscopes in order to obtain a wider field of view necessary for multi-fiber connector inspection).

It is noted that is some embodiments (e.g., adapter tips designed for inspecting Senko CS or SN duplex connectors), the field of view of the inspection microscope may be wide enough to image both endfaces at once. In such cases, no relay optics may be necessary in the adapter tip to laterally shift the optical paths of the light beams.

In any case, even though the two optical fiber endfaces are imaged concurrently, there may be a slight discrepancy in the optical path lengths corresponding to the two optical-fiber endfaces. For that reason, the two endfaces as images concurrently may not be simultaneously in focus on said image sensor(s). Capturing a single image to cover both enfaces may therefore be unsuccessful or imperfect in some cases.

This can be solved by capturing a first image while the focus is adjusted so one optical fiber endface is in focus and capturing a second image while the focus is adjusted so the other optical fiber endface is in focus. The first and the second images may then be used to characterize the first and the second optical-fiber endfaces, respectively.

In accordance with a first aspect, there is provided an adapter tip to be employed with an optical-fiber connector endface inspection microscope device for imaging two optical-fiber endfaces of a duplex optical-fiber connector, the adapter tip comprising:

a housing having:
  a mating interface on one end, configured to mechanically engage with the duplex optical-fiber connector for inspecting the optical-fiber endfaces; and
  a connection mechanism on the other end, to releasably attach to the inspection microscope device; and
  a hollow body extending between the one end and the other end allowing light beam reflected from the optical fiber endfaces to propagate to the objective lens of the inspection microscope device; and
relay optics disposed in said hollow portion of said housing and configured to laterally shift a first optical path of a first light beam reflected from one of the optical fiber endfaces to bring the first light beam closer to a second optical path of a second light beam reflected from the other one of the optical fiber endfaces, so that the two optical fiber endfaces may be imaged concurrently within the field of view of the inspection microscope device which would otherwise be too narrow to image the two optical-fiber endfaces at once.

In accordance with a second aspect, there is provided an optical-fiber connector endface inspection microscope system for imaging two optical-fiber endfaces of a duplex optical-fiber connector, the microscope system comprising:

an optical-fiber connector endface inspection microscope device having a field of view that is too narrow to image the two optical-fiber endfaces at once; and
an adapter tip connectable to the optical-fiber connector endface inspection microscope device and comprising:
  a housing having:

a mating interface on one end, configured to mechanically engage with the duplex optical-fiber connector for inspecting the optical-fiber endfaces;

a connection mechanism on the other end, to releasably attach to the inspection microscope device; and a hollow body extending between the one end and the other end allowing light beam reflected from the optical fiber endfaces to propagate to the objective lens of the inspection microscope device; and relay optics disposed in said hollow portion of said housing and configured to laterally shift a first optical path of a first light beam reflected from one of the optical fiber endfaces to bring the first light beam closer to a second optical path of a second light beam reflected from the other one of the optical fiber endfaces, so that the two optical fiber endfaces may be imaged concurrently within the field of view of the inspection microscope device which would otherwise be too narrow to image the two optical-fiber endfaces at once.

In some embodiments, the optical path of the light beam reflected from the other one of the optical fiber endface remains unshifted. In other embodiments, relay optics may be configured to shift both optical paths to bring them closer to one another, e.g., in a symmetric configuration. But the former asymmetric configuration advantageously employs less components compared to the symmetric configuration, which helps keep the adapter tip compact while functional. Removing optical components on one side also helps saving on the assembly time and lowers the risk of misalignments and rejects.

In some embodiments, the relay optics comprise a pair of optical wedges and the housing comprises two wedge holders in which the optical wedges are respectively affixed and wherein the hollow body and the wedge holders are machined as part of an integral piece of metal. It is often encountered in the art that optical components are fixed in distinct metal pieces and then assembled. This is hard to align and require highly qualified technicians, and rejects are high. The proposed wedge holders machined as part of the hollow body makes the adapter tip easier to assemble in a drop and fix system which and overcomes alignment issues. An additional benefit of the approach is the ability to use optical wedges of a fairly large size. At some points, smaller optical components become harder to produce, so more expensive. Smaller components are also harder to manipulate, assemble and align with tight tolerances. The proposed wedge holders allow to maximize the dimension of the optical wedges.

In accordance with a third aspect, there is provided an optical-fiber connector endface inspection microscope system for imaging two optical-fiber endfaces of a duplex optical-fiber connector, the microscope system comprising:

an optical-fiber connector endface inspection microscope device comprising at least one image sensor for capturing images of the endfaces to be inspected, an objective lens system comprising a focusing lens for adjusting a focus of the objective lens system on the at least one image sensor, and a controller; and an adapter tip connectable to the optical-fiber connector endface inspection microscope device and comprising:

a housing having:

a mating interface on one end, configured to mechanically engage with the duplex optical-fiber connector for inspecting the optical-fiber endfaces;

a connection mechanism on the other end, to releasably attach to the inspection microscope device; and a hollow body extending between the one end and the other end allowing light beams respectively reflected from the optical fiber endfaces to concurrently propagate to the objective lens system of the inspection microscope device for imaging the two optical-fiber endfaces at once on said at least one image sensor;

wherein the controller is configured to:

adjust a focus of the objective lens system in a first position where one of the optical fiber endfaces is in focus on said at least one image sensor and capture a first image; and adjust a focus of the objective lens system in a second position where the other one of the optical fiber endfaces is in focus on said at least one image sensor and capture a second image, wherein the second position is different from the first position.

In accordance with a further aspect, there is provided an adapter tip to be employed with an optical-fiber connector endface inspection microscope device for imaging the two optical-fiber endfaces of a duplex optical-fiber connector, adapter or bulkhead, the adapter tip comprising:

a housing having a mating interface configured to mechanically engage with the duplex optical-fiber connector, adapter or bulkhead for inspecting the optical-fiber endfaces; and a relay optical system disposed in said housing and comprising relay optics to disposed to shift the optical path of the light beam reflected from one of the optical fiber endface toward an optical axis of the optical-fiber connector endface inspection microscope device.

In this specification, unless otherwise mentioned, word modifiers such as "substantially" and "about" which modify a value, condition, relationship or characteristic of a feature or features of an embodiment, should be understood to mean that the value, condition, relationship or characteristic is defined to within tolerances that are acceptable for proper operation of this embodiment in the context its intended application.

Further features and advantages of the present invention will become apparent to those of ordinary skill in the art upon reading of the following description, taken in conjunction with the appended drawings.

The following description is provided to gain a comprehensive understanding of the methods, apparatus and/or systems described herein. Various changes, modifications, and equivalents of the methods, apparatuses and/or systems described herein will suggest themselves to those of ordinary skill in the art. Description of well-known functions and structures may be omitted to enhance clarity and conciseness.

Although some features may be described with respect to individual exemplary embodiments, aspects need not be limited there to such that features from one or more exemplary embodiments may be combinable with other features from one or more exemplary embodiments.

BRIEF DESCRIPTION OF THE DRAWINGS

FIG. 1 (prior art) comprises FIG. 1A and FIG. 1B wherein FIG. 1A is a schematic illustrating the endface of a multi-fiber connector.

FIG. 6 comprises FIGS. 6A, 6B, 6C, 6D, 6E and 6F which are a bottom view, a left-side view, a top view, a right-side view, a front view and a back view of the adapter tip of FIG. 5.

FIG. 8A is a schematic illustrating the relay optics of the adapter tip of FIG. 5, in accordance with one embodiment.

FIG. 8B is a perspective view of the adapter tip of FIG. 5, where the cover plate which otherwise covers the wedge receiving cavity is removed.

FIG. 8C is a close-up view of the wedge receiving cavity of FIG. 8B.

FIG. 9 comprises FIGS. 9A, 9B and 9C, wherein

FIG. 10 comprises FIG. 10A and FIG. 10B, wherein

FIG. 11 comprises FIGS. 11A, 11B and 11C, wherein

FIG. 12 comprises FIGS. 12A, 12B and 12C, wherein

Figure 1A:
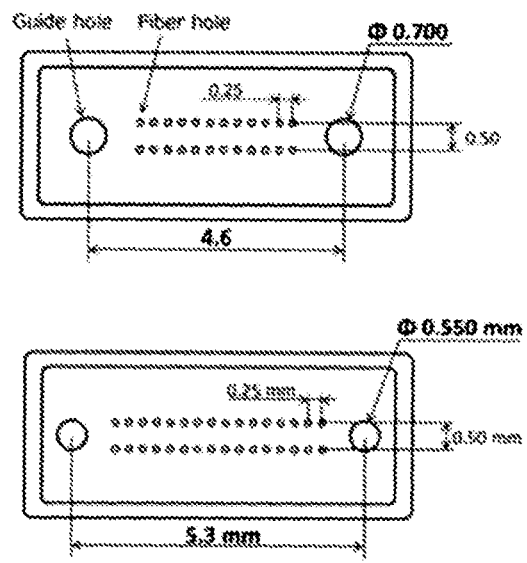
Figure 1B:
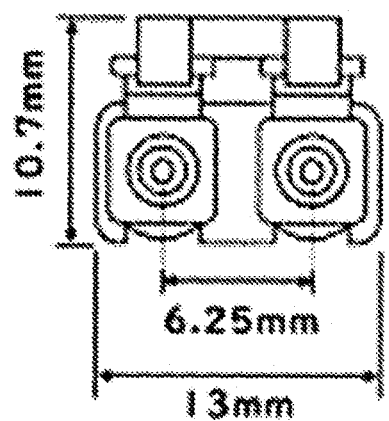
FIG. 1B is a schematic illustrating the endface of a LC Duplex optical fiber connector.

It will be noted that throughout the drawings, like features are identified by like reference numerals. In the following description, similar features in the drawings have been given similar reference numerals and, to not unduly encumber the figures, some elements may not be indicated on some figures if they were already identified in a preceding figure. It should be understood herein that elements of the drawings are not necessarily depicted to scale, since emphasis is placed upon clearly illustrating the elements and structures of the present embodiments. Some mechanical or other physical components may also be omitted in order to not encumber the figures.

DETAILED DESCRIPTION

Now referring to the drawings, FIGS. 2, 3, 4A and 4B illustrate an optical-fiber connector endface inspection microscope system 100 for imaging the optical-fiber endfaces of a duplex optical-fiber connector 2. In some applications, optical-fiber connector 2 to be inspected using an optical-fiber connector endface inspection microscope system 100 is inserted in a connector adapter 4. As known in the art, connector adapters are used to interconnect two optical fibers terminated by optical-fiber connectors such as connector 2. In order for the endfaces of the optical fibers to be brought into close contact, optical-fiber connectors employ fiber-optic ferrules 6 (see FIG. 4B) in which the terminated portion of an optical fiber is inserted. The fiber-optic ferrule 6 and optical fiber assembly is polished at the termination, either perpendicularly to the optical fiber axis or at an 8-degree angle in the case of Angled-polished Physical Contact (APC) connectors, so as to form a ferrule endface enclosing, usually in its center, the optical-fiber endface.

Figure 2:
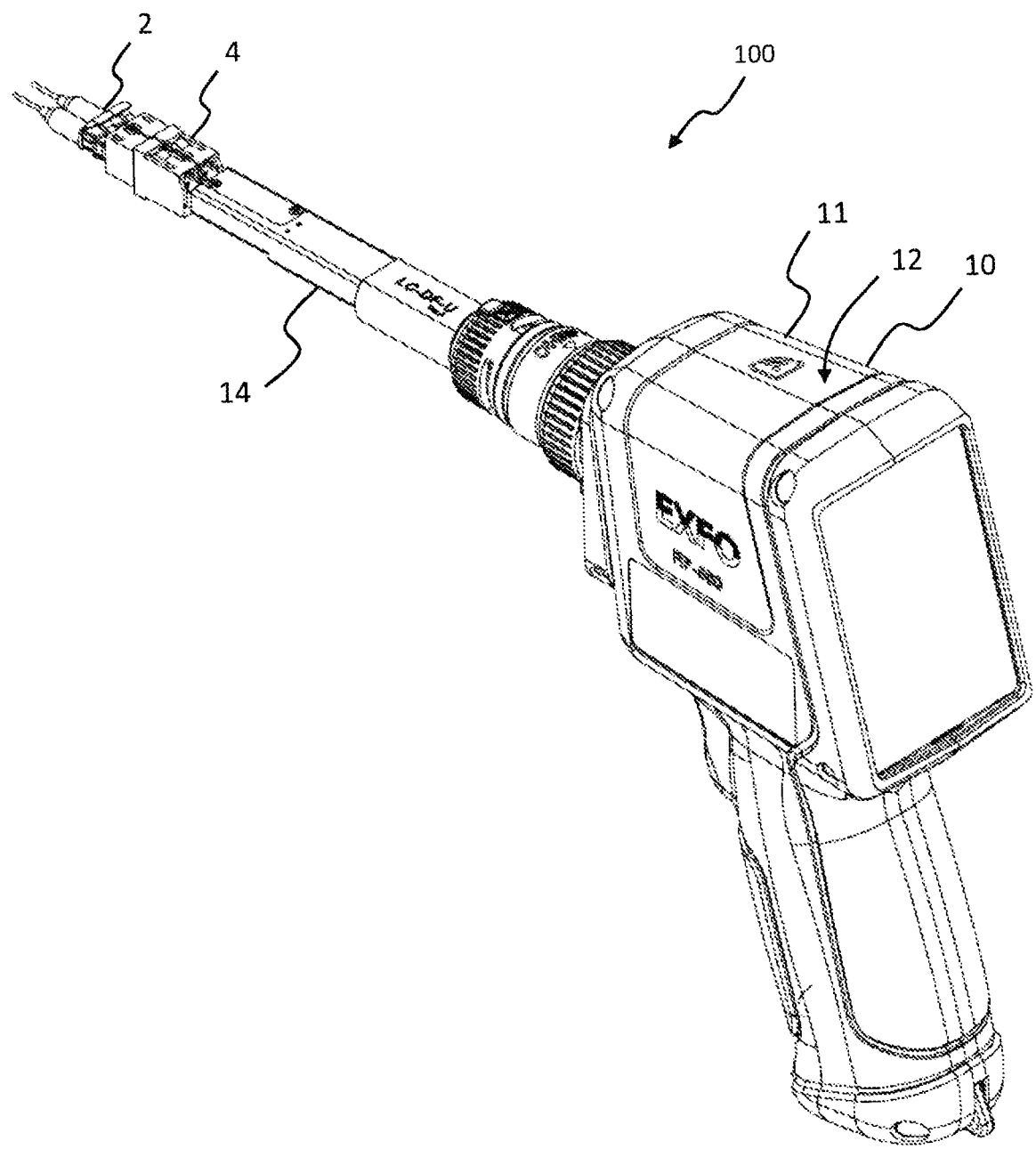
FIG. 2 is a perspective view of an optical-fiber connector endface inspection microscope system comprising an adapter tip for imaging the optical-fiber endfaces of a duplex optical-fiber connector, in accordance with one embodiment which is shown along with the duplex connector under inspection.
Figure 3:
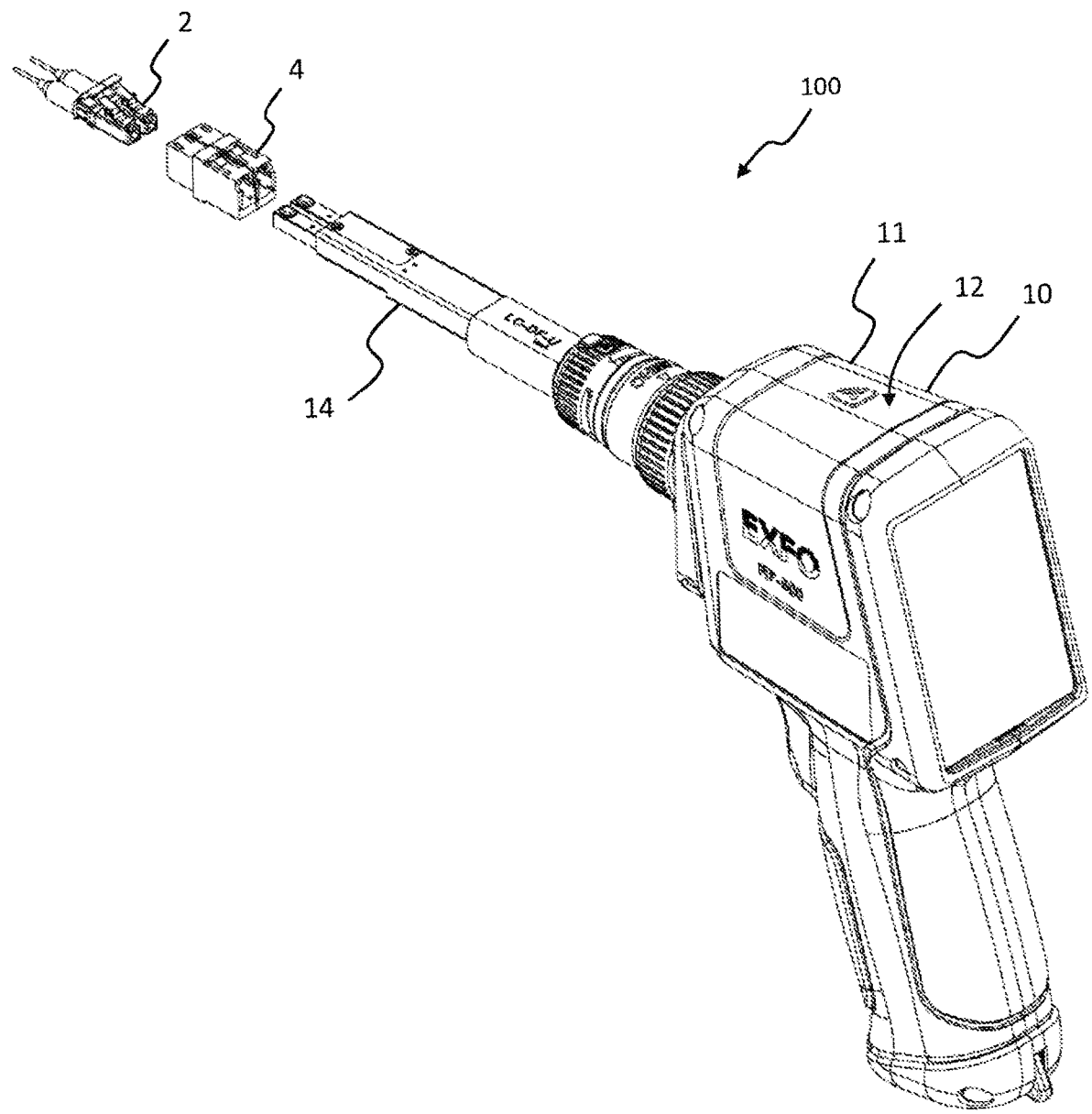
FIG. 3 is an exploded perspective view of the optical-fiber connector endface inspection microscope system of FIG. 2, also shown along with the duplex connector under inspection.

Referring to FIGS. 2 and 3, the optical-fiber inspection microscope system 100 comprises an inspection microscope device 10 comprising a main housing structure 11 enclosing an optical-fiber connector endface inspection microscope 12, and an interchangeable adapter tip 14. It will be understood that the configuration of FIGS. 2 and 3 illustrates one example embodiment of an optical-fiber connector endface inspection microscope system. It should be appreciated by those of ordinary skill in the art that various implementations of the inspection microscope device can be envisaged as known in the art and that the embodiment illustrated herein is no way meant to be limitative.

The inspection microscope device 10 is an inspection microscope device adapted to be employed with a variety of interchangeable adapter tips so as to allow inspection of various types of optical-fiber connectors directly or as inserted in an optical-fiber connector adapter 4. The adapter tip 14 and the inspection microscope device 10 together form an inspection microscope system 100.

The most common adapter tips employed for inspecting, e.g., FC/PC or FC/APC connectors are mostly mechanical adapters and therefore do not include any optical elements. Hence, the input lens of the inspection microscope 12 is referred to herein as the "objective lens" 36 (see FIGS. 4A and 4B).

The illustrated adapter tip 14 is suitable for imaging the optical-fiber endface of a duplex optical-fiber connector 2 and is designed to interface the inspection microscope device 10 with a duplex optical-fiber connector 2 that is inserted in a duplex connector adapter 4. That being said, in order to inspect male duplex optical-fiber connectors 2, one simply needs to connect a duplex connector adapter 4 to the duplex optical-fiber connector to be inspected. Although the embodiment illustrated herein is configured to interface with LC duplex connectors, it should be understood that its mechanical and optical elements may be modified to interface with other formats of duplex optical-fiber connectors and connector adapters including, without limitation, Senko CS, SN and US Conec MDC duplex connector formats.

Figure 4A:
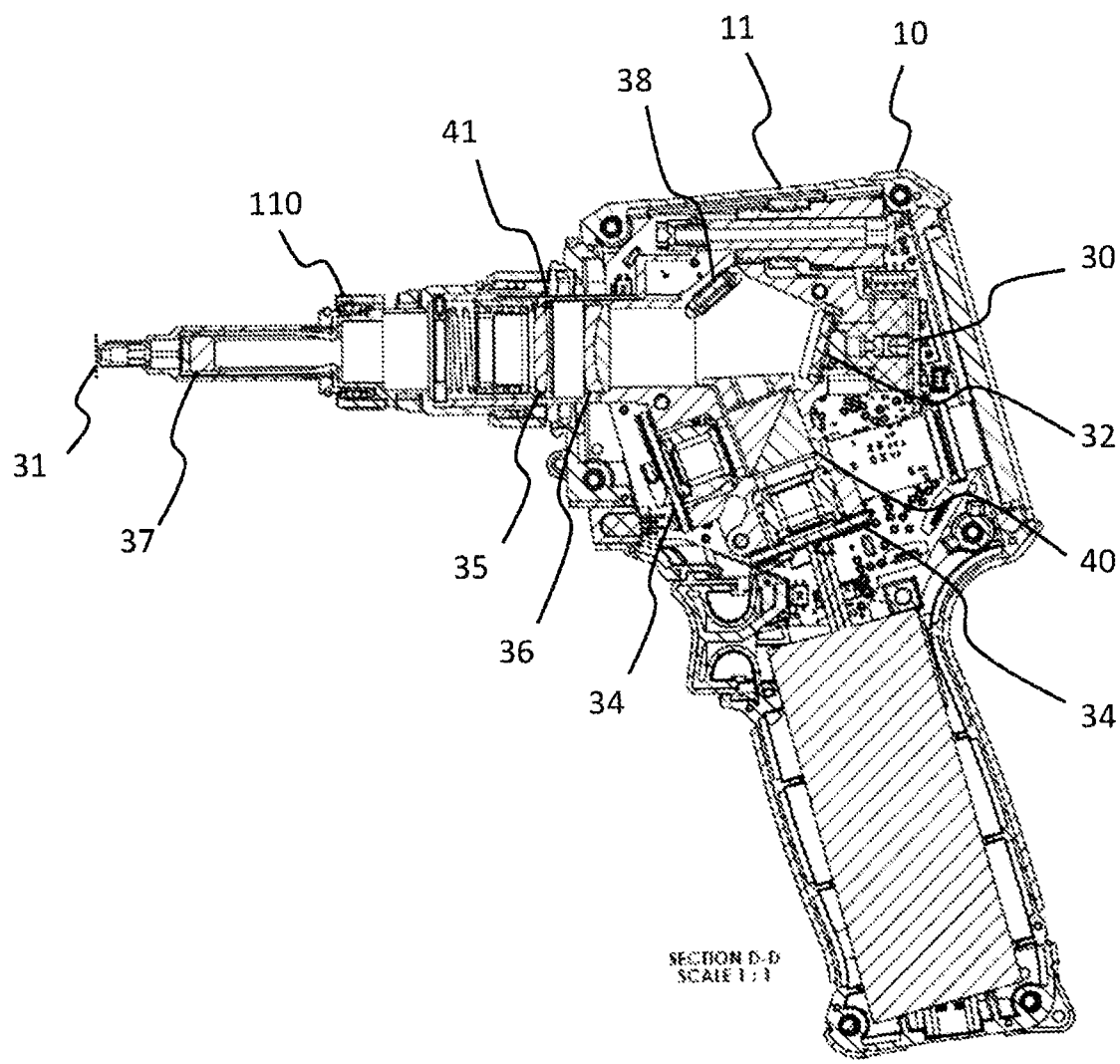
FIG. 4A is a cross-sectional view of the optical-fiber connector endface inspection microscope system of FIG. 2.
Figure 4B:
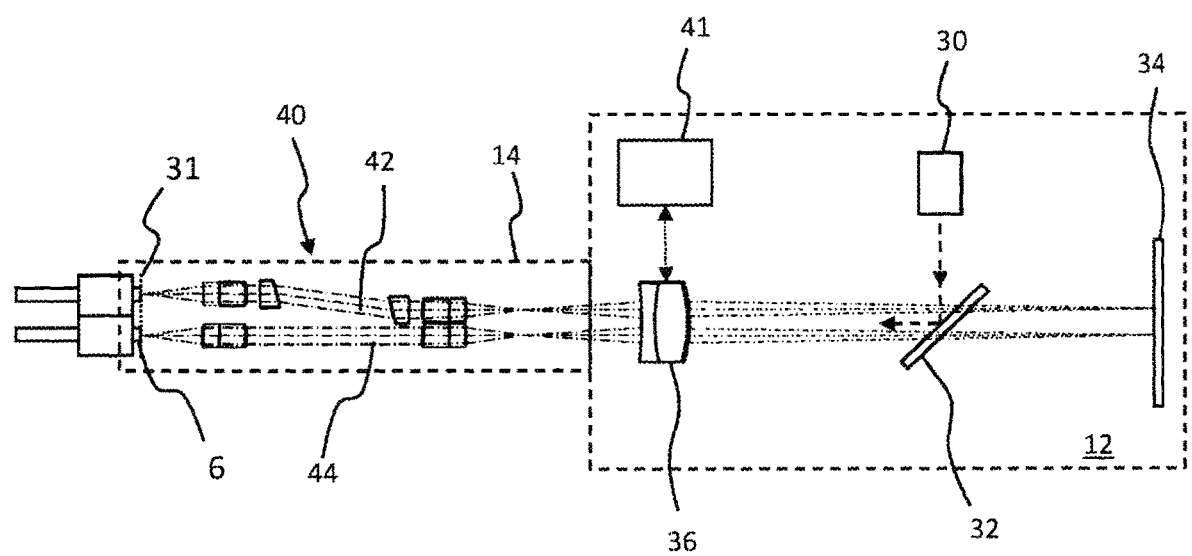
FIG. 4B is a schematic illustrating the main components of the optical-fiber connector endface inspection microscope system of FIG. 2, in accordance with one embodiment.
Figure 5:
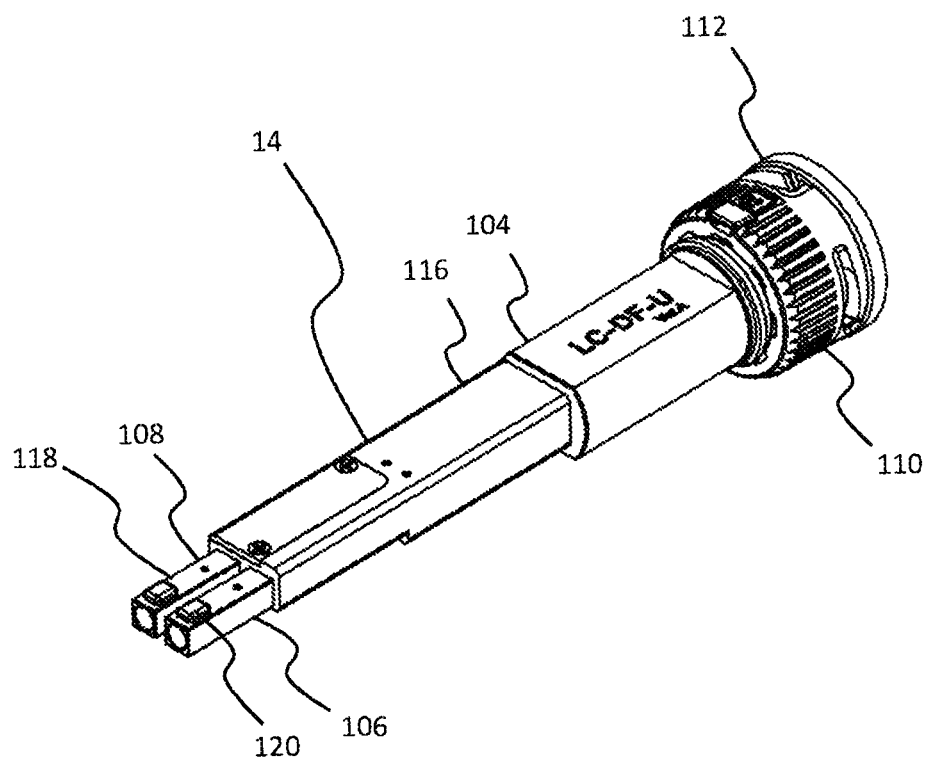
FIG. 5 is a perspective view of an adapter tip, in accordance with one embodiment.

Referring to FIGS. 4A and 4B, generally, an inspection microscope incorporates an imaging assembly comprising an illumination source arrangement 30, an illumination beam splitter 32, one or more image sensors 34 (two image sensors in the embodiment of FIG. 4A and a single one in that of FIG. 4B), imaging optics and an actuator 41. The illumination source arrangement 30 illuminates the connector endface to be inspected and which lies on an object plane 31. The illumination beam splitter 32 directs illumination light toward the connector endface. The image sensor(s) 34 captures at least one image of the endface to be inspected. The imaging optics comprises an objective lens system 35, 36, 37 (and optionally other lenses, mirrors (see, e.g., 38) and/or other optical components (e.g., beamsplitter 40)), for imaging the illuminated connector endface, on the image plane(s) coinciding with the image sensor(s) 34. The object plane 31 as defined herein coincides with the plane where the connector endface to be inspected (i.e., the object) should be positioned relative to the objective lens system (within the focusing range thereof) to be suitably imaged on the image sensor(s) 34. The optical path between the object plane and the image plane defines an imaging path of the inspection microscope 12, along which propagates the inspection light beam resulting from a reflection of illumination light on the connector endface, for optical magnification of the object (i.e., the connector endface) positioned on the object plane 31. In the case of the adapter tip 14, there are two optical/imaging paths, one for each optical-fiber endface of the duplex optical-fiber connector 2.

More specifically, the objective lens system of the embodiment of FIG. 4A comprises a focusing lens 35 for adjusting a focus of the objective lens system (here movable using the actuator 41) and some fixed lenses 36, 37. It will be understood that the objective lens system may further comprise other lenses or optical elements as required by the optical design, which lenses and optical elements can be either fixed relative to the microscope system or movable, e.g., held fixed with the focusing lens.

It is noted that in other embodiments, focus may be adjusted using a deformable focusing lens instead of a movable focusing lens. In such case, the focusing lens 35 may also remain fixed during focus adjustment.

In the embodiment of FIG. 4A, two image sensors 34 are disposed so as to capture images of respective regions over the connector endface (i.e., left and right regions of the connector endface). The light beam reflected on the inspected endface is split among the two image sensors 34 using the beamsplitter 40 and is split so as to produce an image of a left-side region of the connector endface on one image detector 34 and an image of a right-side region on the other image detector 34. This is achieved by adequately offsetting each image detectors relative to the center axis of the optical system. The two images may be stitched in processing to obtain a single image covering the whole region of interest over the connector endface. Such configuration can be useful, e.g., for multi-fiber connector inspection and may also be used for duplex connector inspection.

As shown in the embodiment of FIG. 4B, it is also possible to use a single image sensor 34 to cover the whole region of interest over the duplex connector endface, depending on the available technology and required image resolution.

In the case of duplex connectors such as that shown in FIG. 2, the connector endface includes two ferrules 6, each defining an optical-fiber endface to be inspected. As known in the art, in order to properly image the optical-fiber endface, the light beam reflected from the endface (through reflection of the illumination light on the connector endface) should be appropriately collected by the inspection microscope objective lens 36. Because of the distance between the ferrules 6 of duplex connectors, the field of view of a typical single-fiber or multi-fiber inspection microscope may not be wide enough to allow inspection of both ferrules at once. Referring to FIG. 4A, for that reason, the microscope system 100 comprises an adapter tip 14 which comprises relay optics 40 configured to allow inspection of both ferrules 6 at once. The adapter tip 14 defines two optical/imaging paths, i.e., one for each fiber-optic ferrule 6 of the duplex optical-fiber connector 2. The relay optics 40 is configured to laterally shift the optical path of the light beam 42 reflected from one optical fiber endface (corresponding to the first ferrule) to bring the first light beam closer to the optical path of the light beam 44 reflected from the other optical fiber endface (corresponding to the second ferrule), so that both light beams can be collected by the objective lens 36 of the inspection microscope 12 and both endfaces can be imaged concurrently within the field of view of the inspection microscope (which would otherwise be too narrow to image the two optical-fiber endfaces at once).

It is noted that even though both endfaces can be imaged concurrently within the field of view of the inspection microscope, because of possible mechanical play and micro misalignments in both the duplex optical-fiber connector 2 and the adapter tip 14 as well as differences in optical path lengths within the inspection microscope 12, both enfaces may not be concurrently at focus on the image sensor(s). For that reason, two images may need to be captured with different focus adjustments of the objective lens system, i.e., one for each endface of the duplex connector 2. In one embodiment, a controller is used to control the actuator 41 and move the focusing lens 35 for adjusting a focus of the objective lens system. The controller is configured to adjust a focus of the objective lens system in a first position where one of the optical fiber endfaces is in focus on the image sensor and capture a first image and then adjust a focus of the objective lens system in a second position where the other one of the optical fiber endfaces is in focus on the image sensor and capture a second image (wherein the second position may be different from the first position). Depending on the configuration of the inspection microscope 12 (single or dual image sensor), both images may be captured using the same or distinct image sensors.

Referring to FIGS. 5-12, the adapter tip 14 comprises a housing 104 having a mating interface 106 on its proximal end 108 configured to mechanically engage with the connector adapter 4, a connection mechanism 110 on its distal end 112 to releasably attach to the housing structure 11 of the inspection microscope device 10 and a hollow light-relaying body 116 (better shown in FIG. 9C) between its proximal end 108 and its distal end 112 allowing light beams reflected from the optical fiber endfaces to propagate from the optical-fiber endfaces to the objective lens 36 of the inspection microscope 12.

The mating interface 106 has outer dimensions that are substantially complementary to inner dimensions of a connector adapter 4 so that it easily inserts into the connector adapter 4 in close proximity with the optical-fiber endfaces to be inspected, and this without direct contact with the optical-fiber endface. Alignment of adapter tip 14 with the optical-fiber connector 2 is at least partly achieved by the small mechanical play of the mating interface 106 within the connector adapter 4. The connector adapter 4 typically includes two distinct interfacing channels, one for each of two connectors forming the duplex optical-fiber connector 2. In order to fit in such connector adapter 4, the mating interface 106 comprises two connecting nozzles 118 made of hollow members forming two distinct channels and designed to relay light beams reflected from respective optical fiber endfaces toward the hollow body 116 of the adapter tip 14. The connecting nozzles 118 each include a small latch 120 made to secure the mating interface 106 in the connector adapter 4 during inspection.

The adapter tip 14 may be made easily releasably connectable to the main housing structure 11 using a connection mechanism 110 such as a twist and lock mechanism (as shown) or a screw-threaded mechanism for example. The inspection microscope main housing structure 11 has a corresponding connection mechanism allowing easily releasable connection. Of course, other solid and releasable connection mechanisms such as a bayonet connector for example may be used instead.

As better seen in FIGS. 8A, 9C, 11C and 12A, the relay optics 40 defines two distinct optical paths, i.e., one for the light beam 42 reflected from one optical fiber endface (corresponding to the first ferrule) and the other for the light beam 44 reflected from the other optical fiber endface (corresponding to the second ferrule). Along each optical path, the relay optics 40 comprises a pair of collimating lenses 122, 124 (herein complex converging lenses) which focal points are designed to substantially collimate the light beam 42, 44 between the two lenses 122, 124 and reproduce the object lying on the object plane 31, on an intermediate image plane 126 for proper imaging using the inspection microscope 12.

The collimating lenses 122, 124 are used to elongate the adapter tip 14 relative to a nominal length dictated by the focal length of the objective lens system 35, 36, 37 and increase the distance between the object plane 31 and the objective lens 37, so as to allow insertion of additional optical components along the optical paths. It is however noted that other designs of the objective lens system (e.g., longer focal length) and/or adapter tip 14 may be envisaged, which designs may not necessitate such collimating lenses 122, 124.

The relay optics 40 further comprises pair of small optical wedges 128, 130 (also known in the art as wedge prisms) disposed along the optical path of the light beam 42. The optical wedges are configured to laterally shift the optical path of the light beam 42 so as to bring it closer to the optical path of the light beam 44. The first optical wedge 128 slightly deviates the optical path in a direction toward the optical path of the light beam 44, whereas the second optical wedge 130 brings it back straight, i.e., parallel to its original direction. At the input of the relay optics 40, the two optical paths are parallel, and so are they at the output.

More specifically, the first optical wedge 128 comprises a first end face 125 and a second end face 127. The first end face is perpendicular to the optical path and therefore do not have significant effect on the light beam 42. However, the second end face 127 is tilted relative to an optical axis of the light beam 42 and thereby acts as a first refracting plane surface so as to deviate the light beam 42 towards the optical path of the light beam 44. Similarly, the second optical wedge 130 comprises a first end face 129 and a second end face 131. The first end face 129 is tilted relative to an optical axis of the light beam 42 and thereby acts as a second refracting plane surface so as to deviate the light beam 42 again so it exists the relay optics in a direction that is substantially parallel to the optical path of the light beam 44. The second end face 131 is perpendicular to the optical path and therefore do not have significant effect on the light beam 42.

Such relay optics 40 allows to preserve the quality of the images produced on the image sensor(s). The wedges themselves are also quite simple and inexpensive. The distance between the two wedges can be adapted to produce different adapter tips designed for other formats of duplex connectors having different ferrule spacings.

In this embodiment, only one of the optical paths is shifted. No optical wedges are included in the optical path of the light beam 44, which then remains unshifted. As better seen, e.g., in FIG. 10B, it is noted that the center position between the two connecting nozzles 118 of the adapter tip 14 is slightly offset relative to the center of the objective lens 37 so that the center position between the optical paths is centered on the objective lens 37 once shifted, so that both endfaces can be imaged appropriately in the field of view of the inspection microscope device.

In the illustrated embodiment, wedges are included along only one of the optical paths. As can be better seen in FIG. 12B, such asymmetric configuration allows for a design that is not larger than the LC duplex connector adapter (also known as bulkhead). Notably, the asymmetric approach makes the design very compact by minimizing the number of components. Including shifting optical components on one path only not only saves on the components cost itself but also on the assembly time. Less complex tips also mean lower risks of misalignments and rejects. The saved space allows more flexibility on the mechanical solutions.

Figure 7:
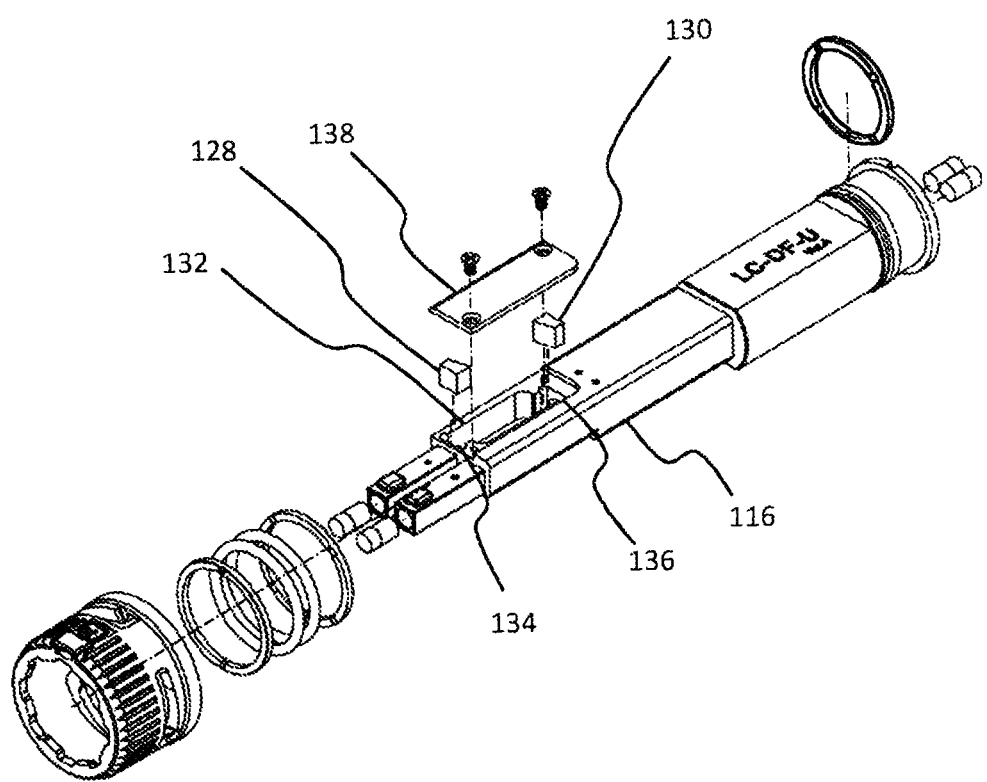
FIG. 7 is an exploded perspective view of the adapter tip of FIG. 5.
Figure 9A:
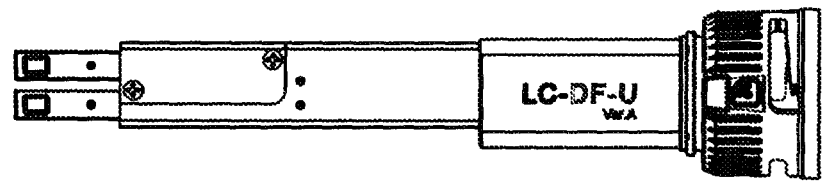
FIG. 9A and FIG. 9B are a top view and a left-side view of the adapter tip of FIG. 5, respectively.
Figure 9B:
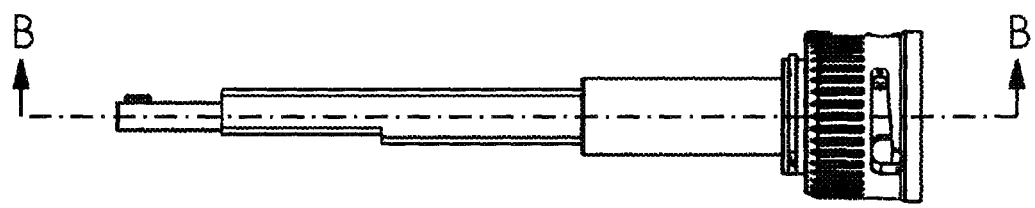
Figure 9C:
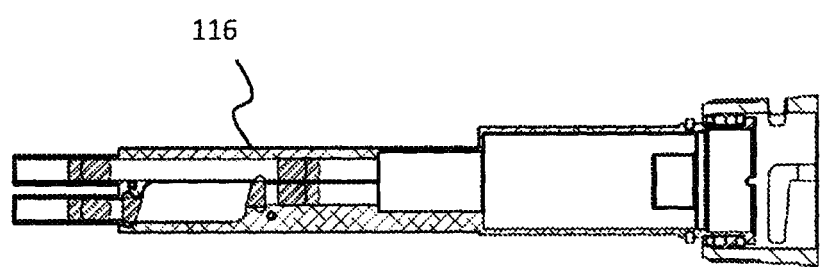
FIG. 9C is a cross-sectional view of the adapter tip along line B-B of FIG. 9B.
Figure 10A:
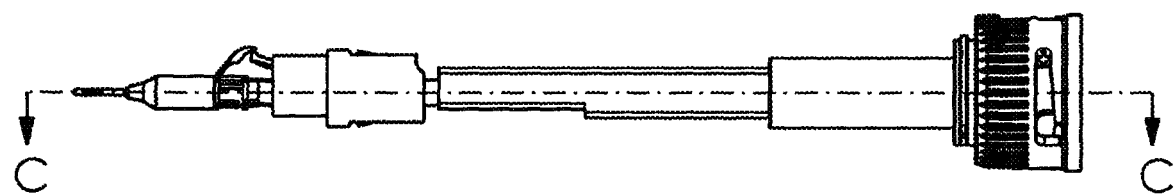
FIG. 10A is a left-side view of the adapter tip of FIG. 5 shown with the optical-fiber connector under inspection and FIG. 10B is a cross-sectional view of the adapter tip and optical-fiber connector along line C-C of FIG. 10A.
Figure 10B:
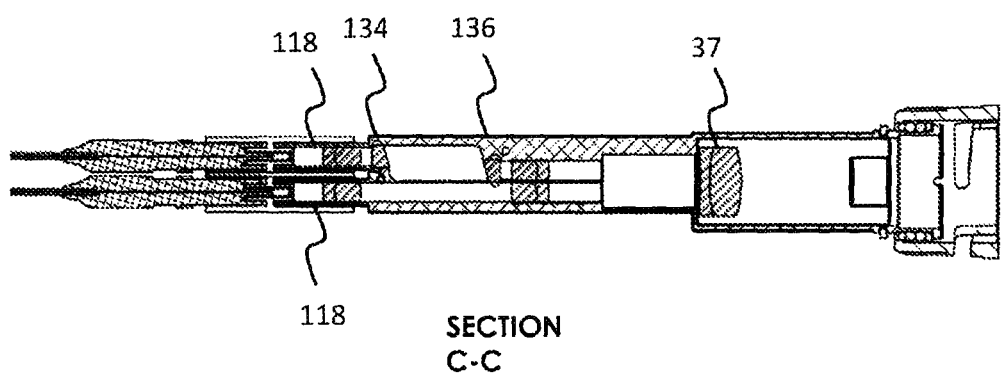

Referring to FIG. 7, in the adapter tip 14 is designed for easy manufacturing and optical alignment. It is often encountered that two wedges are fixed in two different metal pieces and then assembled. This is hard to align and require highly qualified technicians, and rejects are high. Conversely, in the illustrated embodiment, the two wedges 128, 130 are packaged in a small pocket or cavity 132 machined directly in the hollow body 116 and comprising two wedge holders 134, 136 in which the optical wedges 128, 130 are respectively affixed (e.g., glued in place using an adhesive). More specifically, the hollow body 116 and wedge holders are machined as part of an integral piece of metal. The optical wedges 128, 130 can be installed by a simple drop and fix process which do not require any optical alignment, making the adapter tip 14 very easy to assemble. A cover plate 138 covers the cavity 132 to protect the optical components from the surrounding environment.

Figure 11A:
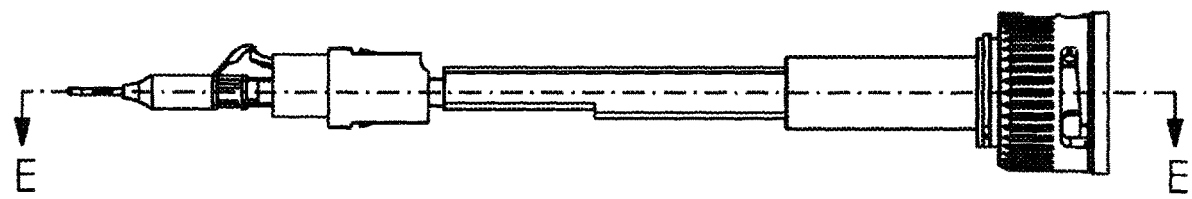
FIG. 11A is a left-side view of the adapter tip of FIG. 5 shown with the optical-fiber connector under inspection.
Figure 11B:
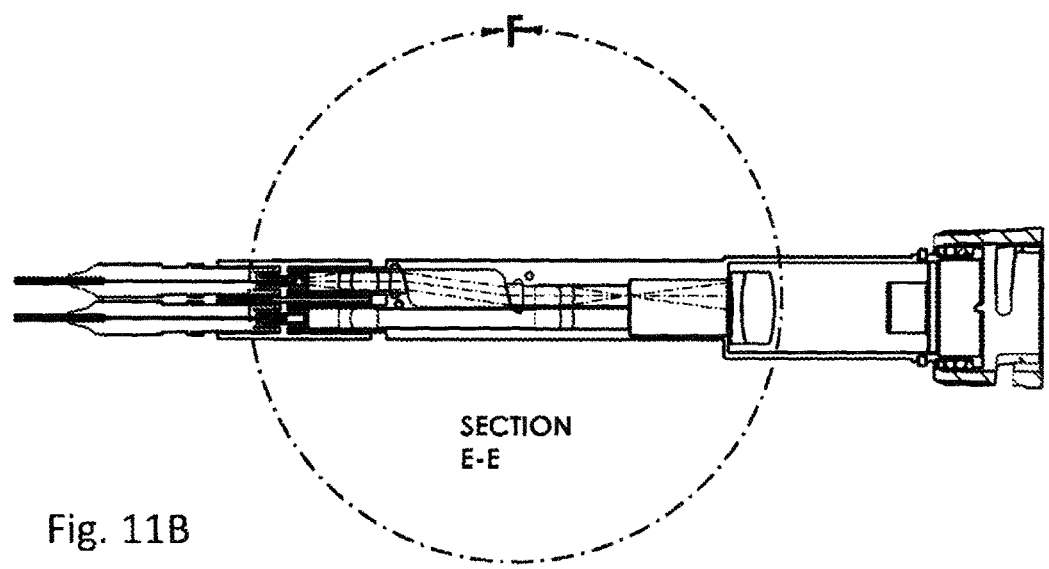
FIG. 11B is a cross-sectional view of the adapter tip along line E-E of FIG. 11A.
Figure 11C:
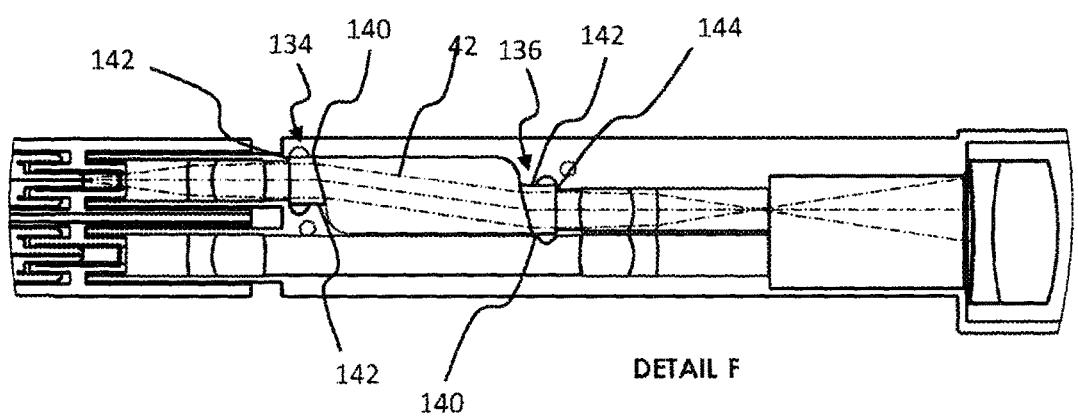
FIG. 11C is a close-up view of the relay optics of FIG. 11B showing the optical path corresponding to the first ferrule.
Figure 12A:
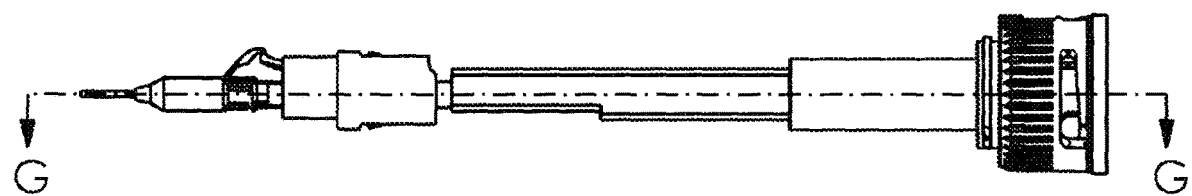
FIG. 12A is a left-side view of the adapter tip of FIG. 5 shown with the optical-fiber connector under inspection.
Figure 12B:
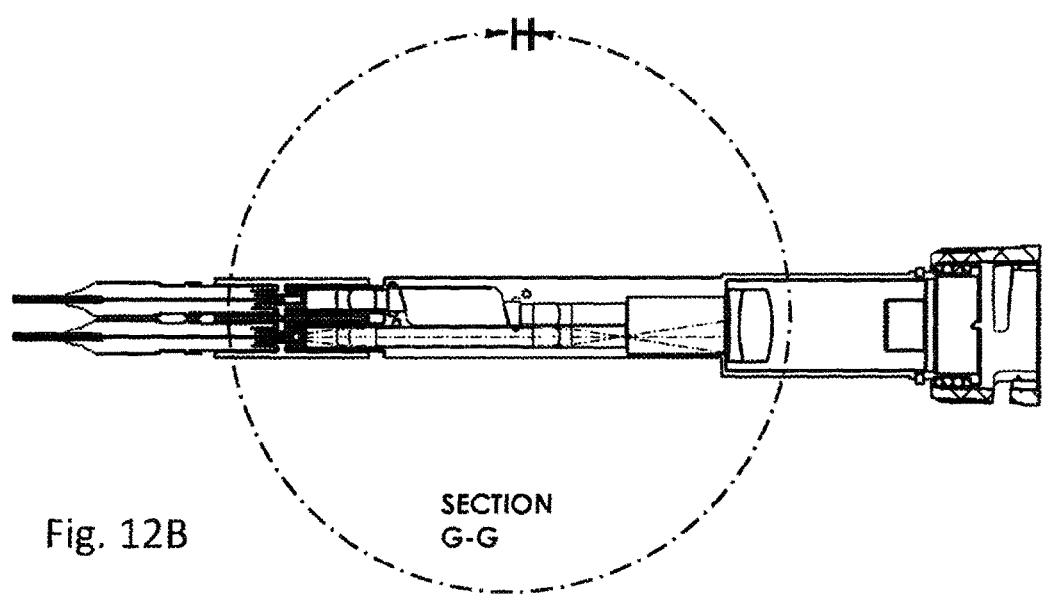
FIG. 12B is a cross-sectional view of the adapter tip along line G-G of FIG. 12A.
Figure 12C:
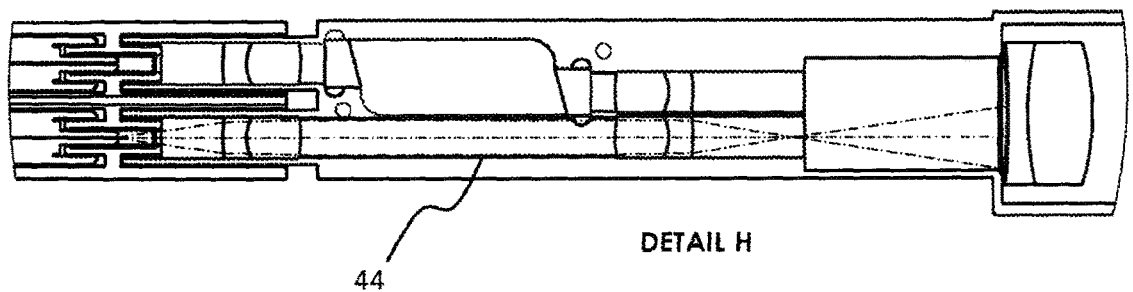
FIG. 12C is a close-up view of the relay optics of FIG. 12B showing the optical path corresponding to the second ferrule.

As better shown in FIG. 11C, alignment is achieved by each wedge holder 134, 136 comprising a pair of parallel surfaces 138, 140 which are machined with tight mechanical tolerances so as fit the wedge therebetween with tight mechanical play. Stoppers 144 are also machined to help longitudinally position the wedges 128, 130 in the adapter tip 14. The parallel surfaces 140, 142 are disposed so as to work against one another when the body is subject to thermal expansion, i.e., without inducing rotating forces on the wedges 128, 130, so as to maintain the optical alignment over the operational temperature range.

An additional benefit of this pocket-like assembly is the ability to use optical wedges of a fairly large size. At some points, smaller optical components become harder to produce, so more expensive. Smaller components are also harder to manipulate, assemble and align with tight tolerances. The pocket-like assembly allows to maximize the dimension of the wedges within the allowed adapter tip footprint.

Of course, dimensions of this cost-effective pocket-like configuration may be modified to adapt to various possible distances between the two wedges.

Figure 13A:
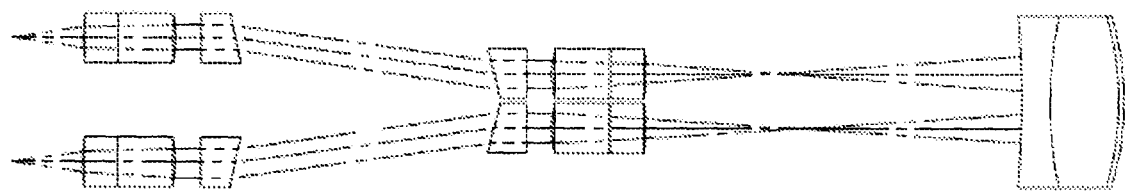
FIG. 13A is a schematic illustrating relay optics of an adapter tip in accordance with a symmetrical embodiment which comprises a pair of wedges along both optical paths.

Although in the embodiment of FIGS. 5-12, the optical path corresponding to a single one of the ferrules of the duplex connector is being shifted (asymmetric configuration), it is noted that in other embodiments, both optical paths may also be shifted toward one another using appropriate optics, e.g., in a symmetric configuration. For example, as illustrated in FIG. 13A, it may be envisaged to include optical wedges along both optical paths so as to further shift the optical paths closer to one another in a symmetric way.

Figure 13B:
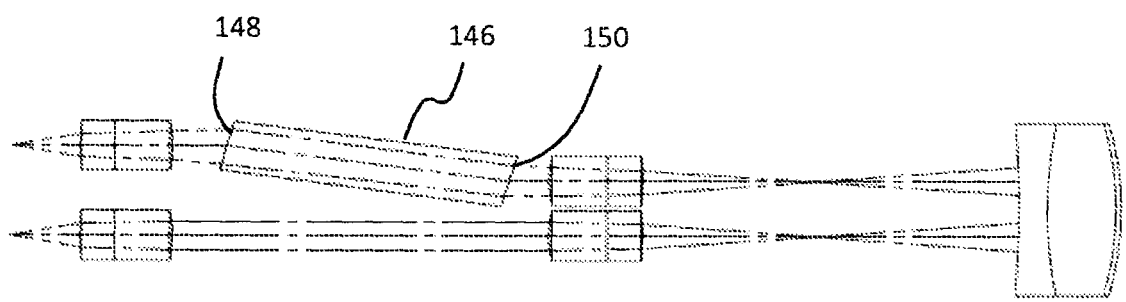
FIG. 13B is a schematic illustrating relay optics of an adapter tip in accordance with another embodiment in which the pair of optical wedges are replaced by an optical prism.

Furthermore, although the embodiment of FIGS. 5-12 herein employs optical wedges to shift the optical path, one skilled in the art will understand that the wedges could be replaced with other optical components, including, without limitation, rhomboid or other optical prisms, parallel wedge plates and conventional lenses with small offsets. It is noted that, the optical wedge solution was found to well preserve the image quality and also allows for a substantial angular shift which helps keep the adapter tip short. But an optical prism can be designed to offer the same advantage. FIG. 13B shows such an embodiment employing an optical prism 146 comprising a first surface 148 and a second surface 150 respectively acting as the first refracting plane surface and the second refracting plane surface of the embodiment of FIGS. 5-12.

Figure 13C:
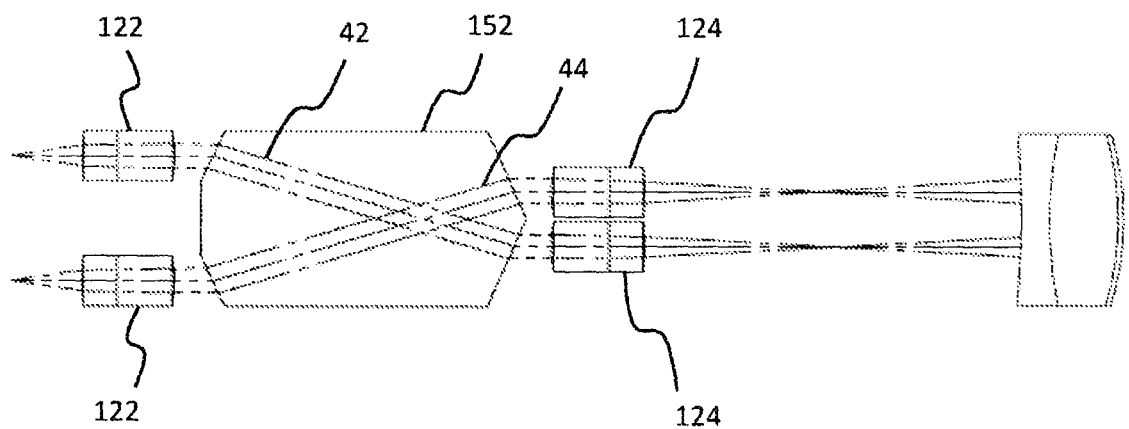
FIG. 13C is a schematic illustrating relay optics of an adapter tip in accordance with another symmetrical embodiment in which two pairs of optical wedges are replaced by a multifaced optical prism.

FIG. 13C shows a further embodiment employing a multifaced optical prism 152 to create a symmetric configuration. In this illustrated case, the optical paths are deviated such that the optical path of the light beam 42 crosses over the optical path of the light beam 44 within the optical prism.

Figure 13D:
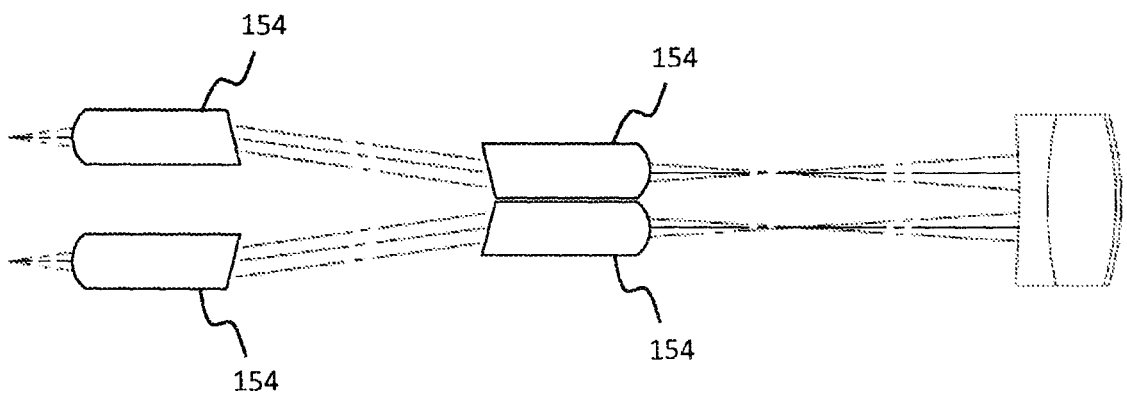
FIG. 13D is a schematic illustrating relay optics of an adapter tip in accordance with yet another embodiment in which pairs of collimating lens and optical wedge are replaced by an angularly faced lens (C-lens).

FIG. 13D shows yet a further embodiment in which each pair of collimating lens and optical wedge is replaced by an angularly faced lens (also called "C-lens") 154. Although here illustrated in a symmetric configuration. It will be understood that the asymmetric embodiment of FIG. 8A may also be modified in the same way.

In even further embodiments, depending on the distance between the ferrules of a duplex connector, relay optics may even be unnecessary to image both enfaces of the duplex connector within the field of view of the inspection microscope device.

It is further noted that although the illustrated embodiment is designed for the non-angled polished LC duplex connectors, angle-polished variations of the adapter tip may be devised as well using the same approach.

Example of Inspection Microscope Device Architecture

Figure 14:
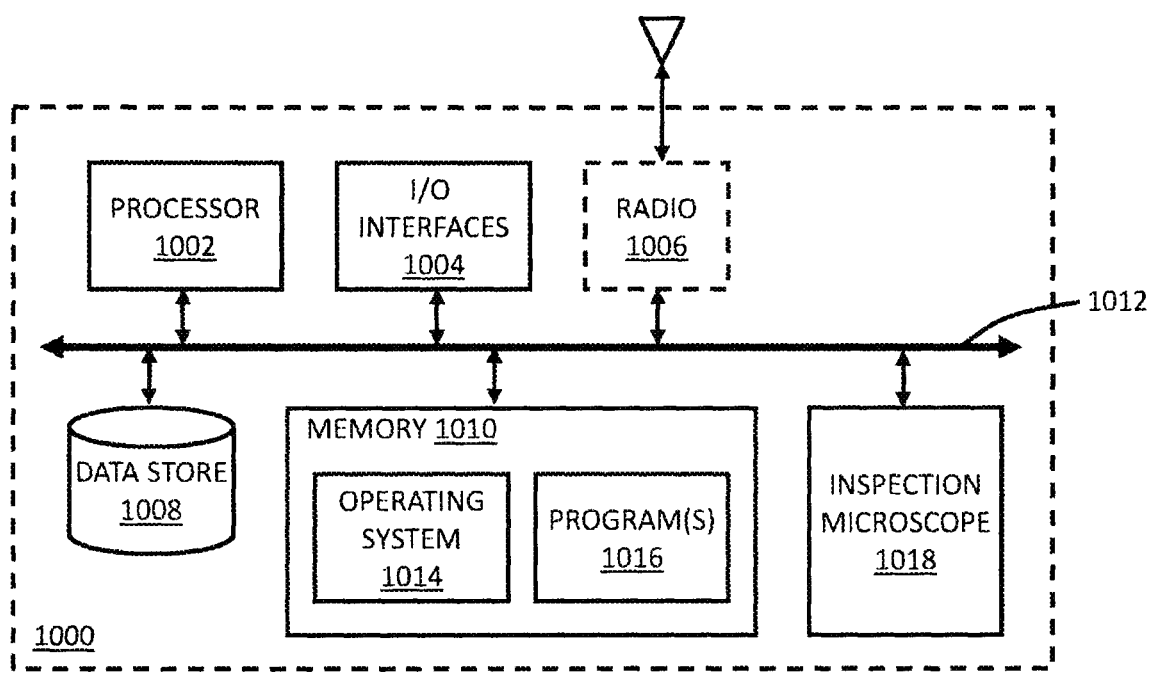
FIG. 14 is a bloc diagram illustrating an example architecture of an inspection microscope device of the optical-fiber connector endface inspection microscope system of FIG. 2.

FIG. 14 is a block diagram of an inspection microscope device 1000 which may embody the inspection microscope device 10 of FIGS. 2, 3 and 4A. The inspection microscope device 1000 may comprise a digital device that, in terms of hardware architecture, generally includes a processor 1002, input/output (I/O) interfaces 1004, an optional radio 1006, a data store 1008, a memory 1010, as well as an optical test device including an inspection microscope 1018. It should be appreciated by those of ordinary skill in the art that FIG. 14 depicts the inspection microscope device 1000 in a simplified manner, and a practical embodiment may include additional components and suitably configured processing logic to support known or conventional operating features that are not described in detail herein. A local interface 1012 interconnects the major components. The local interface 1012 can be, for example, but not limited to, one or more buses or other wired or wireless connections, as is known in the art. The local interface 1012 can have additional elements, which are omitted for simplicity, such as controllers, buffers (caches), drivers, repeaters, and receivers, among many others, to enable communications. Further, the local interface 1012 may include address, control, and/or data connections to enable appropriate communications among the aforementioned components.

The processor 1002 is a hardware device for executing software instructions. The processor 1002 may comprise one or more processors, including central processing units (CPU), auxiliary processor(s) or generally any device for executing software instructions. When the inspection microscope device 1000 is in operation, the processor 1002 is configured to execute software stored within the memory 1010, to communicate data to and from the memory 1010, and to generally control operations of the inspection microscope device 1000 pursuant to the software instructions. The processor 1002 may implement a controller used to control the operation of the image detectors and the illumination sources of the inspection microscope 1018, e.g., to capture images from each image detector in sequence while also activating the illumination sources in sequence. The controller may further be used to control the actuator used to move the focusing lens 35 for adjusting a focus of the objective lens system.

In an embodiment, the processor 1002 may include an optimized mobile processor such as optimized for power consumption and mobile applications. The I/O interfaces 1004 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like, via one or more LEDs or a set of LEDs, or via one or more buzzer or beepers, etc. The I/O interfaces 1004 can be used to display a graphical user interface (GUI) that enables a user to interact with the inspection microscope device 1000 and/or output at least one of the values derived by the inspection microscope analyzing software.

The radio 1006, if included, may enable wireless communication to an external access device or network. Any number of suitable wireless data communication protocols, techniques, or methodologies can be supported by the radio 1006, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); NarrowBand Internet of Things (NB-IoT); Long Term Evolution Machine Type Communication (LTE-M); magnetic induction; satellite data communication protocols; and any other protocols for wireless communication. The data store 1008 may be used to store data, such as inspection microscope images. The data store 1008 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1008 may incorporate electronic, magnetic, optical, and/or other types of storage media.

The memory 1010 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 1010 may incorporate electronic, magnetic, optical, and/or other types of storage media. Note that the memory 1010 may have a distributed architecture, where various components are situated remotely from one another, but can be accessed by the processor 1002. The software in memory 1010 can include one or more computer programs, each of which includes an ordered listing of executable instructions for implementing logical functions. In the example of FIG. 14, the software in the memory 1010 includes a suitable operating system (O/S) 1014 and computer programs 1016. The operating system 1014 essentially controls the execution of other computer programs and provides scheduling, input-output control, file and data management, memory management, and communication control and related services. The program(s) 1016 may include various applications, add-ons, etc. configured to provide end-user functionality with the inspection microscope device 1000. For example, example programs 1016 may include a web browser to connect with a server for transferring inspection result data files, a dedicated inspection microscope application configured to control inspection microscope measurements by the inspection microscope 1018, set image acquisition parameters, analyze connector endface images obtained by the inspection microscope 1018 and display a GUI related to the inspection microscope device 1000.

It is noted that, in some embodiments, the I/O interfaces 1004 may be provided via a physically distinct mobile device (not shown), such as a handheld computer, a smartphone, a tablet computer, a laptop computer, a wearable computer or the like, e.g., communicatively coupled to the inspection microscope device 1000 via the radio 1006. In such cases, at least some of the programs 1016 may be located in a memory of such a mobile device, for execution by a processor of the physically distinct device. The mobile may then also include a radio and be used to transfer measurement data files toward a remote test application residing, e.g., on a server.

The embodiments described above are intended to be exemplary only and one skilled in the art will recognize that numerous modifications can be made to these embodiments without departing from the scope of the invention. The scope of the invention is therefore intended to be limited solely by the appended claims.

The invention claimed is:

1. An adapter tip to be employed with an optical-fiber connector endface inspection microscope for imaging two optical-fiber endfaces of a duplex optical-fiber connector, the adapter tip comprising:
   a housing having:
      a mating interface on one end, configured to mechanically engage with the duplex optical-fiber connector for inspecting the optical-fiber endfaces; and
      a connection mechanism on the other end, to releasably attach to the inspection microscope; and
      a hollow body extending between the one end and the other end allowing light beams reflected from the optical fiber endfaces to propagate to the objective lens of the inspection microscope; and
   relay optics disposed in said hollow portion of said housing and configured to laterally shift a first optical path of a first light beam reflected from one of the optical fiber endfaces to bring the first light beam closer to a second optical path of a second light beam reflected from the other one of the optical fiber endfaces, so that the two optical fiber endfaces may be imaged concurrently within the field of view of the inspection microscope which would otherwise be too narrow to image the two optical-fiber endfaces at once.

2. The adapter tip as claimed in claim 1, wherein the second optical path of the second light beam reflected from the other one of the optical fiber endfaces remains unshifted.

3. The adapter tip as claimed in claim 1, wherein said relay optics comprises a first refracting plane surface and a second refracting plane surface along said first optical path, wherein said first refracting plane surface and said second refracting plane surface are both tilted relative to an optical axis the first light beam so as to laterally shift said first optical path to bring the first light beam closer to said second optical path of said second light beam.

4. The adapter tip as claimed in claim 3, wherein the relay optics comprise a first optical wedge and a second optical wedge along the first optical path, said first optical wedge defining said first refracting plane surface and said second optical wedge defining said second refracting plane surface.

5. The adapter tip as claimed in claim 4, wherein the housing comprises two wedge holders in which the optical wedges are respectively affixed, and wherein the hollow body and the wedge holders are machined as part of an integral piece of metal.

6. The adapter tip as claimed in claim 3, wherein said relay optics comprises an optical prism along the first optical path, said optical prism comprising a first surface and a second surface respectively defining said first refracting plane surface and said second refracting plane surface.

7. The adapter tip as claimed in claim 1, wherein said relay optics is further configured to laterally shift the second optical path of the second light beam reflected from the other one of the optical fiber endfaces so as to bring the first and the second optical paths closer one another.

8. An optical-fiber connector endface inspection microscope system for imaging two optical-fiber endfaces of a duplex optical-fiber connector, the microscope system comprising:
   an optical-fiber connector endface inspection microscope device having a field of view that is too narrow to image the two optical-fiber endfaces at once; and
   an adapter tip connectable to the optical-fiber connector endface inspection microscope device and comprising:
      a housing having:
         a mating interface on one end, configured to mechanically engage with the duplex optical-fiber connector for inspecting the optical-fiber endfaces;
         a connection mechanism on the other end, to releasably attach to the inspection microscope device; and
         a hollow body extending between the one end and the other end allowing light beam reflected from the optical fiber endfaces to propagate to the objective lens of the inspection microscope device; and relay optics disposed in said hollow portion of said housing and configured to laterally shift a first optical path of a first light beam reflected from one of the optical fiber endfaces to bring the first light beam closer to a second optical path of a second light beam reflected from the other one of the optical fiber endfaces, so that the two optical fiber endfaces may be imaged concurrently within the field of view of the inspection microscope device which would otherwise be too narrow to image the two optical-fiber endfaces at once.

9. The optical-fiber connector endface inspection microscope system as claimed in claim 8, wherein the optical-fiber connector endface inspection microscope device comprises at least one image sensor for capturing images of the endfaces to be inspected, and an objective lens system comprising a focusing lens for adjusting a focus of the objective lens system on the at least one image sensor and a controller; and wherein the controller is configured to:

adjust a focus of the objective lens system in a first position where one of the optical fiber endfaces is in focus on said at least one image sensor and capture a first image; and adjust a focus of the objective lens system in a second position where the other one of the optical fiber endfaces is in focus on said at least one image sensor and capture a second image, wherein the second position is different from the first position.

10. The optical-fiber connector endface inspection microscope system as claimed in claim 8, wherein the second optical path of the second light beam reflected from the other one of the optical fiber endface remains unshifted.

11. The optical-fiber connector endface inspection microscope system as claimed in claim 8, wherein said relay optics comprises a first refracting plane surface and a second refracting plane surface along said first optical path, wherein said first refracting plane surface and said second refracting plane surface are both tilted relative to an optical axis the first light beam so as to laterally shift said first optical path to bring the first light beam closer to said second optical path of said second light beam.

12. The optical-fiber connector endface inspection microscope system as claimed in claim 11, wherein the relay optics comprise a first optical wedge and a second optical wedge along the first optical path, said first optical wedge defining said first refracting plane surface and said second optical wedge defining said second refracting plane surface.

13. The optical-fiber connector endface inspection microscope system as claimed in claim 12, wherein the housing comprises two wedge holders in which the optical wedges are respectively affixed and wherein the hollow body and the wedge holder are machined as part of an integral piece of metal.

14. The optical-fiber connector endface inspection microscope system as claimed in claim 11, wherein said relay optics comprises an optical prism along the first optical path, said optical prism comprising a first surface and a second surface respectively defining said first refracting plane surface and said second refracting plane surface.

15. The optical-fiber connector endface inspection microscope system as claimed in claim 8, wherein said relay optics is further configured to laterally shift the second optical path of the second light beam reflected from the other one of the optical fiber endfaces so as to bring the first and the second optical paths closer one another.

16. The optical-fiber connector endface inspection microscope system as claimed in claim 8, wherein said optical-fiber connector endface inspection microscope device comprises a first image sensor and a second image sensor, disposed so as to capture images of respective regions over the optical-fiber connector endface.

17. An optical-fiber connector endface inspection microscope system for imaging two optical-fiber endfaces of a duplex optical-fiber connector, the microscope system comprising:

an optical-fiber connector endface inspection microscope device comprising at least one image sensor for capturing images of the endfaces to be inspected, an objective lens system comprising a focusing lens for adjusting a focus of the objective lens system on the at least one image sensor, and a controller; and an adapter tip connectable to the optical-fiber connector endface inspection microscope device and comprising:

a housing having:

a mating interface on one end, configured to mechanically engage with the duplex optical-fiber connector for inspecting the optical-fiber endfaces;

a connection mechanism on the other end, to releasably attach to the inspection microscope device; and a hollow body extending between the one end and the other end allowing light beams respectively reflected from the optical fiber endfaces to concurrently propagate to the objective lens system of the inspection microscope device for imaging the two optical-fiber endfaces at once on said at least one image sensor;

wherein the controller is configured to:

adjust a focus of the objective lens system in a first position where one of the optical fiber endfaces is in focus on said at least one image sensor and capture a first image; and adjust a focus of the objective lens system in a second position where the other one of the optical fiber endfaces is in focus on said at least one image sensor and capture a second image, wherein the second position is different from the first position.

18. The optical-fiber connector endface inspection microscope system as claimed in claim 17, wherein the adapter tip further comprises:

a relay optics disposed in said hollow portion of said housing and configured to laterally shift a first optical path of a first light beam reflected from one of the optical fiber endfaces to bring the first light beam closer to a second optical path of a second light beam reflected from the other one of the optical fiber endfaces, so that the two optical fiber endfaces may be imaged within the field of view of the inspection microscope device which would otherwise be too narrow to image the two optical-fiber endfaces at once.

19. The optical-fiber connector endface inspection microscope system as claimed in claim 17, wherein said light beams respectively reflected from the optical fiber endfaces remains unshifted so as to propagate parallelly to one another up to the objective lens system of the inspection microscope device.

20. The optical-fiber connector endface inspection microscope system as claimed in claim 17, wherein said at least one image sensor comprises a first image sensor and a second image sensor, disposed so as to capture images of respective regions over the optical-fiber connector endface; and wherein said controller is configured to capture said first image using said first image sensor and capture said second image using said second image sensor.

* * * * *